United States Patent
Matsumoto et al.

(10) Patent No.: US 6,591,880 B1
(45) Date of Patent: Jul. 15, 2003

(54) PNEUMATIC TIRE INCLUDING ZIG-ZAG CIRCUMFERENTIAL FINE GROOVES

(75) Inventors: Hiroyuki Matsumoto, Kodaira (JP); Ken Masaoka, Kodaira (JP); Akiyoshi Shimizu, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 65 days.

(21) Appl. No.: 09/695,308

(22) Filed: Oct. 25, 2000

(30) Foreign Application Priority Data

Oct. 26, 1999 (JP) .............................................. 11-303583

(51) Int. Cl.⁷ ........................ B60C 11/03; B60C 101/02
(52) U.S. Cl. ............................ 152/209.15; 152/209.19; 152/209.23; 152/209.27
(58) Field of Search ....................... 152/209.15, 209.19, 152/209.23, 209.27, DIG. 3

(56) References Cited

U.S. PATENT DOCUMENTS

| | | | | |
|---|---|---|---|---|
| 2,294,626 A | * | 9/1942 | Overman | |
| 2,708,957 A | * | 5/1955 | Constantakis et al. | |
| 3,402,751 A | * | 9/1968 | Jacobs | |
| 4,385,654 A | * | 5/1983 | Sumikawa et al. | |
| 5,445,201 A | * | 8/1995 | Kukimoto et al. | |
| 5,567,253 A | * | 10/1996 | Iwamura | |
| 5,804,000 A | * | 9/1998 | Shirai et al. | |

FOREIGN PATENT DOCUMENTS

| | | | |
|---|---|---|---|
| DE | 3743878 | * | 7/1988 |
| EP | 787602 | * | 8/1997 |
| JP | 7-117413 | | 5/1995 |
| JP | 8-142610 | * | 6/1996 |
| JP | 8-183309 | * | 7/1996 |
| JP | 8-216624 | * | 8/1996 |
| JP | 9-94829 | * | 4/1997 |
| WO | WO 96/36501 | * | 11/1996 |

* cited by examiner

*Primary Examiner*—Steven D. Maki
(74) *Attorney, Agent, or Firm*—Sughrue Mion, PLLC (57) ABSTRACT

A pneumatic tire comprises a pair of bead portions, a pair of sidewall portion, a tread portion, a radial carcass of at least one ply, and a belt, wherein the tread portion is provided with two or more circumferential main grooves formed in a tread rubber at an inner region sandwiched by both shoulder regions and one or more circumferential ribs defined by two adjoining circumferential main grooves, and at least two circumferential fine grooves are formed in the circumferential rib.

8 Claims, 5 Drawing Sheets

PNEUMATIC TIRE INCLUDING ZIG-ZAG CIRCUMFERENTIAL FINE GROOVES

BACKGROUND OF THE INVENTION

1. Field of the Invention

This invention relates to a pneumatic tire, and more particularly to a heavy duty pneumatic radial tire for use in relatively large-size vehicles such as truck, bus and the like and improving a resistance to uneven wear in a tread rubber.

2. Description of Related Art

In a tread portion of the pneumatic tire, a crown part forming a ground contact area usually has a convex shape made of a plurality of arcs smoothly connected to each other at a section of the tire for adequately holding a ground contact form or a ground contact pressure distribution. Such a convex shape of the crown part can avoid a case that when the tire is run under loading, a ground contact pressure in a shoulder region of the tread portion directly subjected to an influence of a stiffness in a sidewall portion becomes higher than that of the other region.

On the other hand, a diameter of a central region in the crown part is made larger than a diameter of the shoulder region by rendering the crown part into the convex shape, so that the following force is created in the ground contact face of the tread portion. That is, since a peripheral length of the central region is longer than a peripheral length of the shoulder region, when the tire is run under loading, a forward force directing to a running direction of the tire is created in the ground contact face of the central region, while a rearward force directing to a braking direction of the tire is created in a ground contact face of the shoulder region.

Under the action of these forward and rearward forces, a worn amount of a tread rubber in the central region strongly subjected to an influence of a traction force increases in a tire mounted onto a driving shaft, while a worn amount of a tread rubber in the shoulder region strongly subjected to an influence of a braking force increases in a tire mounted onto a non-driving shaft. Since the increase of these rubber worn amounts is compared with a rubber worn amount of the other region, uneven wear is caused in the tread rubber of the crown part. Particularly, such a remarkable wear in the central region of the tire mounted onto the driving shaft is so-called center wear and is a serious problem. However, it is impossible to largely change the convex shape of the crown part because of the above reasons.

SUMMARY OF THE INVENTION

It is, therefore, an object of the invention to provide a pneumatic tire having an excellent resistance to uneven wear by largely mitigating the forward and rearward forces generated while holding the convex shape of the crown part to prevent the occurrence of uneven wear of a tread rubber, particularly center wear.

According to the invention, there is the provision of a pneumatic tire comprising a pair of bead portions, a pair of sidewall portions, a tread portion, a radial carcass of at least one ply reinforcing these portions, and a belt reinforcing the tread portion; said tread portion being provided with two or more circumferential main grooves formed in a tread rubber at an inner region sandwiched by both shoulder regions and one or more circumferential ribs defined by two adjoining circumferential main grooves, wherein at least two circumferential fine grooves are formed in the circumferential rib.

In this case, definitions of the tire are decided by industrial standards effective in zones manufacturing or using tires. For example, they are defined by "Year Books of The Tire and Rim Association Inc." in USA, "Standards Manual of The European Tire and Rim Technical Organization" in Europe, or "JATMA Year Book of The Japan Automobile Tire Manufactures Association, Inc." in Japan.

In a preferable embodiment of the invention, each of the circumferential fine grooves in the circumferential rib has such a form that a bisector putting at a center of a groove width of the fine groove in a direction of a groove depth thereof is parallel to a normal line passing through a center of a width of a rib portion defined by the two adjoining circumferential fine grooves.

In another preferable embodiment of the invention, each of the circumferential fine grooves in the circumferential rib has such a form that a bisector putting at a center of a groove width of the fine groove in a direction of a groove depth thereof is inclined with respect to a normal line passing through a center of a width of a rib portion defined by the two adjoining circumferential fine grooves so as to widen toward an inside of the tire.

In the other preferable embodiment of the invention, a surface of a rib portion defined by the two adjoining circumferential fine grooves is offset radially inward with respect to a surface of a rib portion defined by the circumferential groove and the circumferential fine groove adjacent thereto.

In a still further preferable embodiment of the invention, the two adjoining circumferential fine grooves are extended zigzag in the circumferential direction of the tread portion so as to form constricted parts corresponding to knots and width-enlarged parts corresponding to bellies in the rib portion defined by these circumferential fine grooves. In this case, a difference between a maximum width of the width-enlarged part and a minimum width of the constricted part as to the width in a rotating axial direction of the tire is larger in a surface position of the rib portion than in a bottom position of the circumferential fine groove. In a further preferable embodiment of the invention, the two adjoining circumferential fine grooves have a straight bottom shape.

BRIEF DESCRIPTION OF THE DRAWINGS

The invention will be described with reference to the accompanying drawings, wherein.

DESCRIPTION OF PREFERRED EMBODIMENTS

The pneumatic tire according to the invention comprises a pair of bead portions, a pair of sidewall portions, a tread portion, a radial carcass of at least one cord ply and a belt, which are omitted in illustration. The radial carcass is extended between a pair of bead cores (not shown) embedded in the respective bead portions to reinforce the above portions. The belt is comprised of two or more rubberized steel cord layers and disposed on an outer peripheral surface of the radial carcass to reinforce the tread portion.

Figure 1:
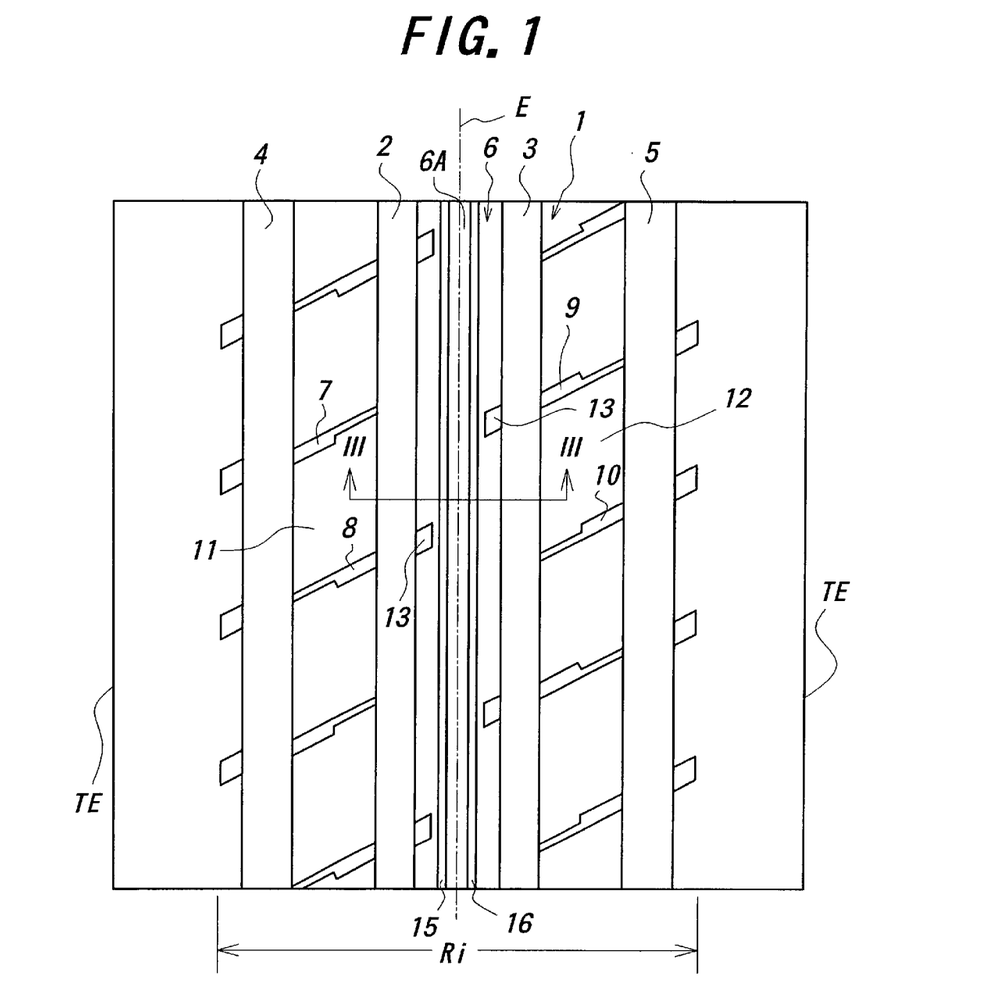
FIG. 1 is a schematically developed view of a ground contact face of an embodiment of the pneumatic tire according to the invention.

In FIG. 1, the tread portion has such a ground contact face 1 that an outer profile of a tread rubber at a section of the tire is comprised of a single arc or composite arcs. And also, an inner region Ri of the tread portion as previously defined is provided with two or more circumferential main grooves, four circumferential main grooves 2, 3, 4, 5 in the illustrated embodiment. Furthermore, the tread portion is provided with one or more circumferential ribs defined by two adjoining circumferential main grooves among these circumferential main grooves 2 to 5. Moreover, symbol TE is a ground contact edge. FIG. 1 also shows a tread pattern.

In the tread portion shown in FIG. 1, one circumferential rib 6 defined by the two adjoining circumferential main grooves 2, 3 is formed in the inner region Ri. And also, the inner region Ri of the tread portion is provided with blocks 11, 12 defined by the two adjoining circumferential main grooves 2, 4 and the two adjoining circumferential main grooves 3, 5 and lateral grooves 7, 8 and 9, 10 opening to these main grooves in addition to the circumferential rib 6. That is, according to the invention, the rib 6 is arranged in at least a central region in the inner region Ri of the tread portion.

When at least one end in both ends of the lateral grooves 7, 8 and the lateral grooves 9, 10 is terminated in a land portion of the tread rubber, a portion corresponding to the blocks 11, 12 is a rib. The rib 6 is provided with notch-shaped lateral grooves 13 each opening at its one end to the circumferential main grooves 2, 3 and terminated at the other end in the rib 6. In brief, the land portion continuing in the circumferential direction of the tread portion is defined as a rib.

Figure 2:
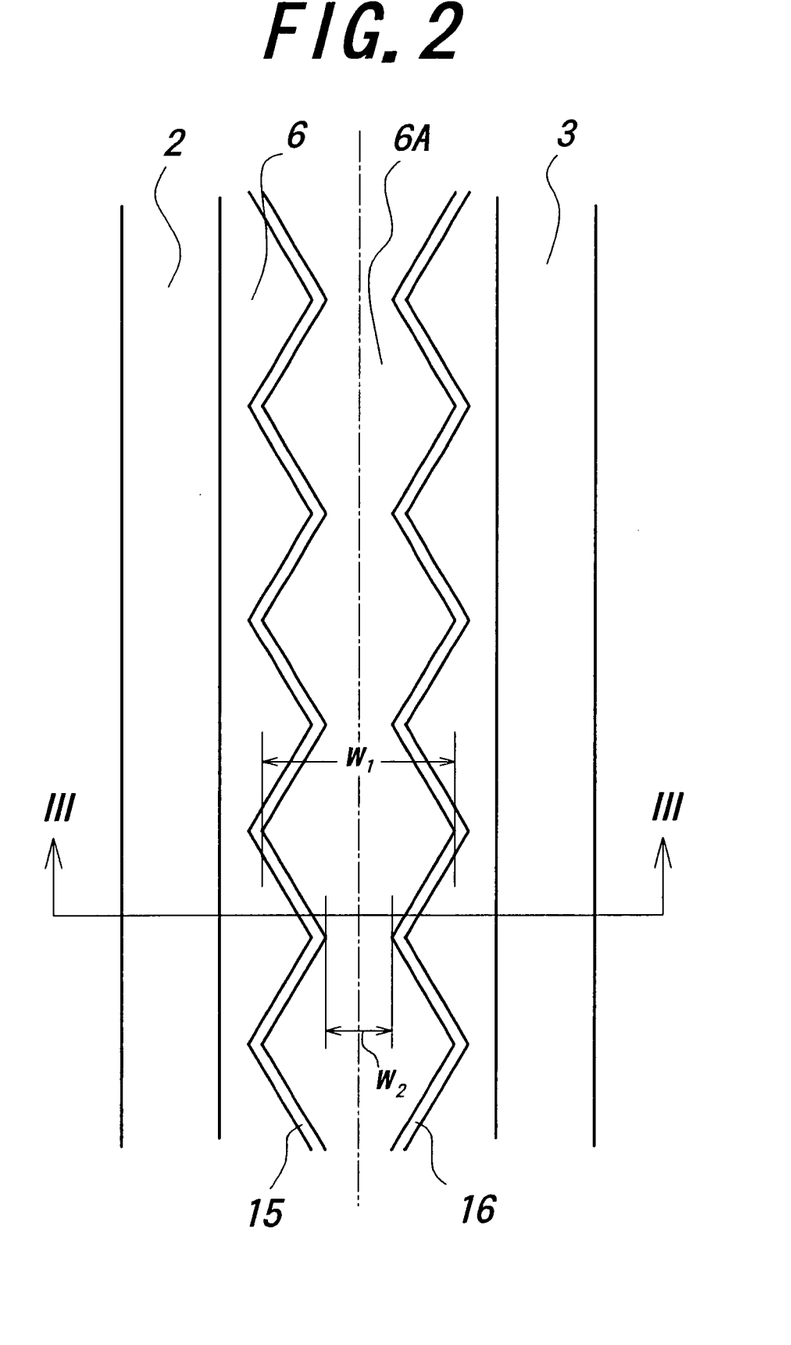
FIG. 2 is a schematically partial developed view of a ground contact face of another embodiment of the pneumatic tire according to the invention.

In FIGS. 1 and 2, the circumferential rib 6 is provided with at least two circumferential fine grooves, two circumferential fine grooves 15, 16 in the illustrated embodiment. The two circumferential fine grooves 15, 16 shown in FIG. 1 are straight grooves, while the two circumferential fine grooves 15, 16 shown in FIG. 2 are zigzag grooves. Moreover, there may be included a case that one of the two circumferential fine grooves is a straight groove and the other fine groove is a zigzag groove. Further, the fine grooves 15, 16 may be zigzag curved grooves different from the illustrated shape.

The fine grooves 15, 16 and a rib portion 6A defined between these fine grooves have the following forms.

Figure 3:
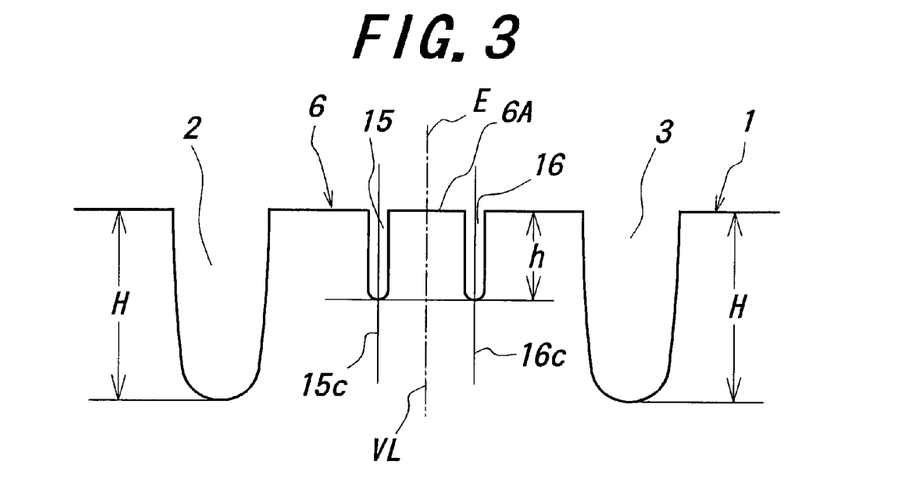
FIG. 3 is a diagrammatically section view of circumferential main grooves and a circumferential rib taken along a line III—III of FIGS. 1 and 2.

The fine grooves 15, 16 shown in FIG. 3 have such a form that a bisector 15c, 16c putting at a center of a groove width of the fine groove 15, 16 in a direction of a groove depth thereof is parallel to a normal line VL passing through a center of a width of a rib portion 6A defined by the two adjoining circumferential fine grooves 15, 16. In this case, the normal line VL is existent on an equatorial plane E of the tire. Moreover, three or more fine grooves may be existent in the rib 6 defined by the two adjoining circumferential main grooves.

Figure 4:
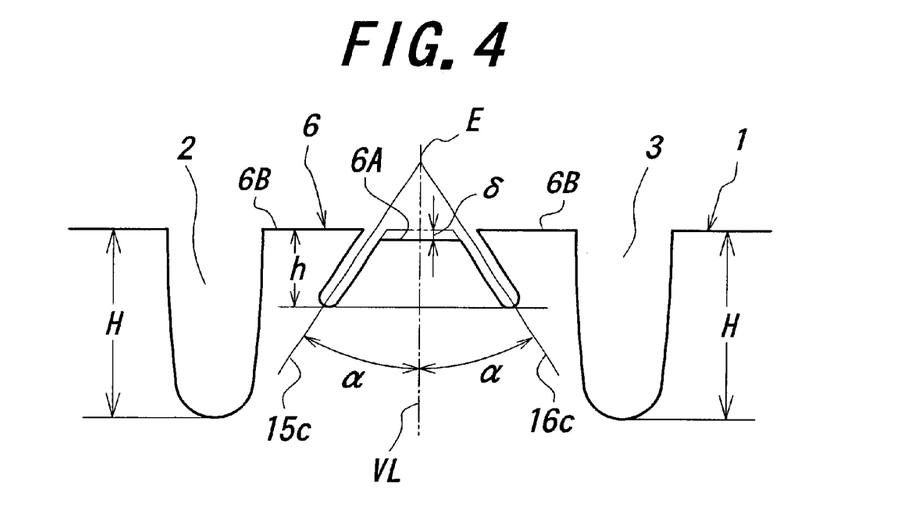
FIG. 4 is a diagrammatically section view of another embodiment illustrating circumferential main grooves and a circumferential rib.

The fine grooves 15, 16 shown in FIG. 4 have such a form that a bisector 15c, 16c putting at a center of a groove width of the fine groove 15, 16 in a direction of a groove depth thereof is inclined with respect to a normal line VL passing through a center of a width of a rib portion 6A defined by the two adjoining circumferential fine grooves 15, 16 so as to widen toward an inside of the tire. The normal line VL is existent on the equatorial plane E of the tire.

The straight fine grooves 15, 16 shown in FIG. 1 and the zigzag fine grooves 15, 16 shown in FIG. 2 may take groove forms shown in FIGS. 3 and 4, respectively.

Figure 5:
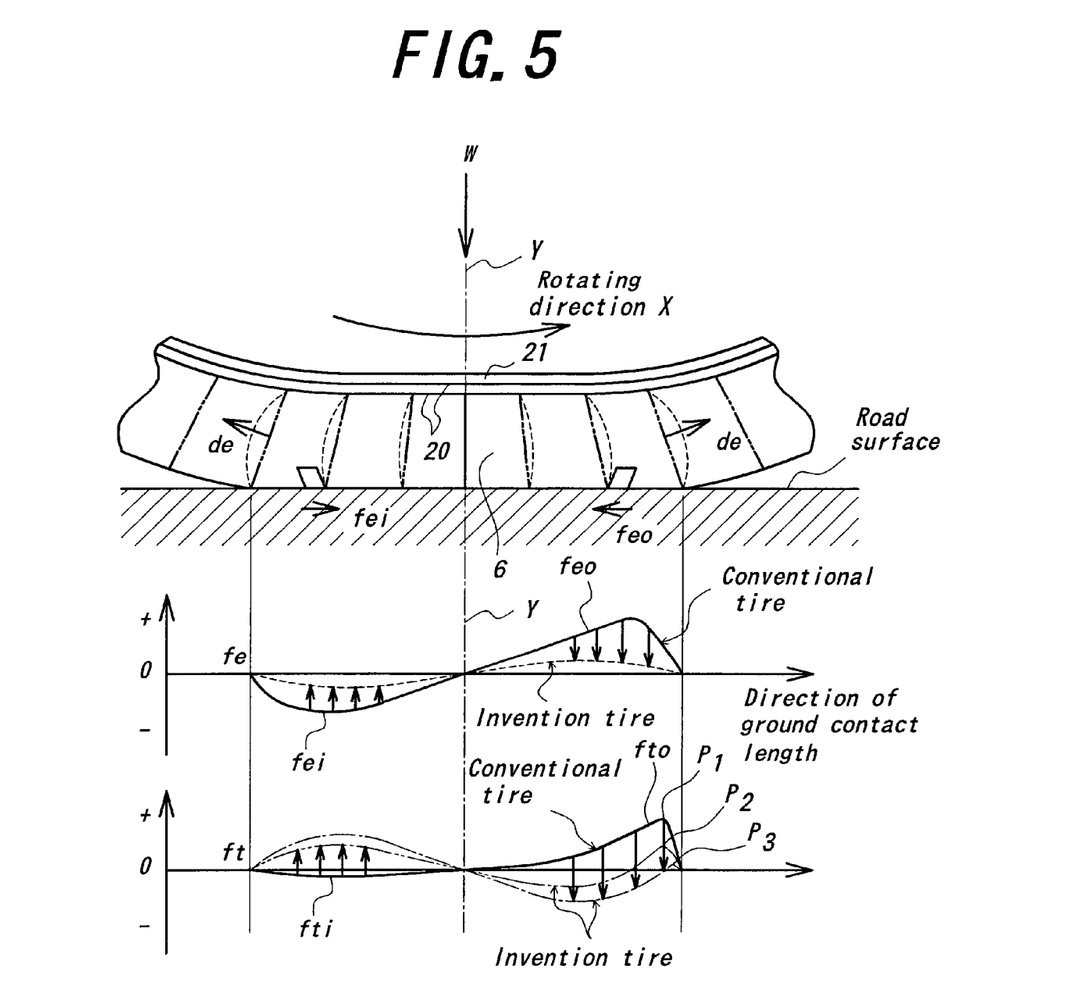
FIG. 5 is a diagrammatic view illustrating forward and backward forces created in a rib at a ground contact state.

In an upper part of FIG. 5 is shown a part of a tire run on a road surface under loading at a section on the same plane as the equatorial plane E of the tire. In FIG. 5, numeral 20 is a belt, and numeral 21 a radial carcass. In a ground contact area of the tread portion shown in FIG. 5, segments divided by phantom lines in the radial direction for convenience' sake are subjected to crush deformation in front and back directions shown by dotted lines through reaction force of a load W between high-stiffness belt 20 and road surface or action of ground contact pressure. A maximum deformation quantity de shown by dotted lines becomes particularly remarkable in a heavy duty pneumatic tire.

The deformation form of each segment in the rib 6 is as follows. That is, as shown by dotted lines in FIG. 5, the segment is firstly bulged ahead of a rotating direction X of the tire or at a trailing side of the tire in a forward running direction of the tire as shown by an arrow by the crush deformation under loading. In this case, the maximum bulging quantity de gradually decreases toward a position Y just under a rotating axial line of the tire and becomes zero just under the axial line. Then, the segment is bulged from the position Y just under the axial line toward a leading side in an arrow direction opposite to the forward running direction of the tire, and the bulging quantity increases up to the maximum bulging quantity de.

As shown by a diamond shape in FIG. 5, a bulging deformation at the road surface side indicates a deformation similar to shearing deformation of the rib 6 restricted by the road surface. The bulging deformation similar to the shearing deformation at the road surface side creates front-back force fe at each position of the road surface 1 along a direction of ground contact length in the rib 6. The front-back force fe is divided into two force components. A first force component is a back force fei in an arrow direction directing to the position Y just under the axial line based on the forward bulging deformation at the leading side. A second force component is a front force feo in an arrow direction directing to the position Y just under axial line based on the rearward bulging deformation at the trailing side. The back force fei and the front force feo are opposite to each other.

In addition to the front-back force fe, each segment of the tread rubber divided by the phantom line is subjected to shearing force fs accompanied with the inclination with respect to the road surface and the like at the ground contact face 1 of the ground contact area. Eventually, front-back resultant force of the front-back force fe and the shearing force fs (ft=fe+fs) is created at each segment of the tread rubber. In the conventional tire, distribution curves of the front-back force fe and the front-back resultant force ft are shown by thick solid lines in lower two parts of FIG. 5, respectively. In the distribution curve, the front force is shown as plus and the back force is shown as minus.

In the front-back resultant force ft of the conventional tire, as shown by the solid line in the lower part of FIG. 5, a maximum value P1 of a front resultant force fto in the central region of the tread portion is larger than a maximum value of a back resultant force fti. In this case, it is important that the front-back resultant force ft is created in a forward direction (driving direction) in the trailing of the tread portion. The wearing of the tread rubber is mainly created by friction between the ground contact face 1 in the trailing and the road surface, during which the wearing of rubber increases as the shearing force becomes larger. Therefore, in order to decrease the worn amount of the tread rubber, it is important to lower the maximum value P1 of the front resultant force fto in the trailing.

Figure 6:
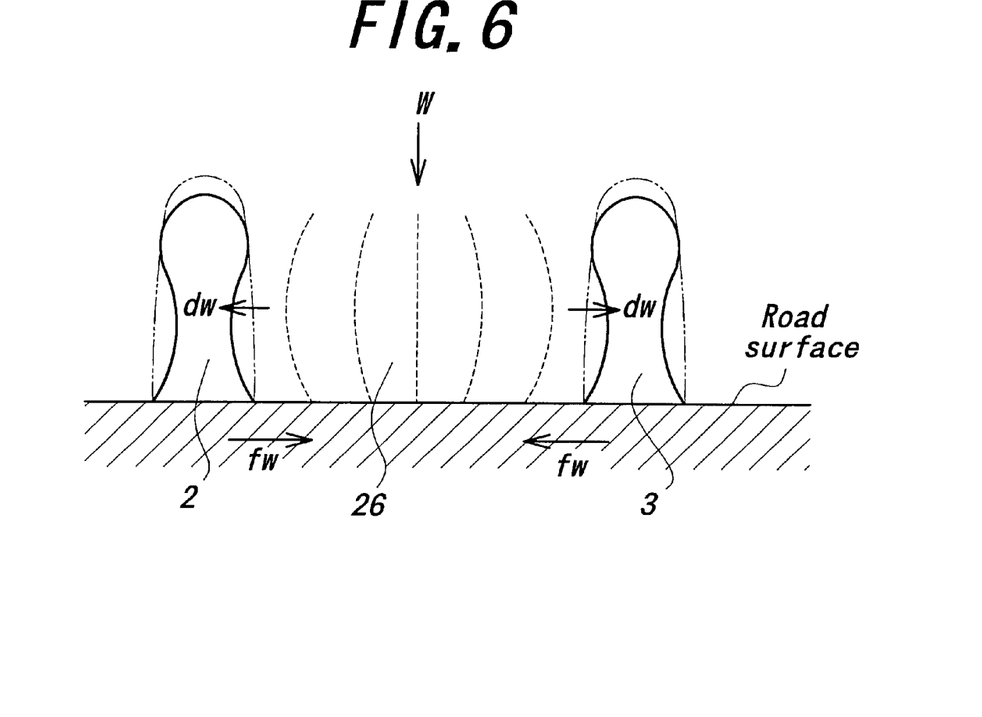
FIG. 6 is a diagrammatic view illustrating a crush bulging deformation of a rib at a ground contact state in the conventional tire.

On the other hand, as the section of the center rib 26 and circumferential main grooves 2, 3 at the ground contact area of the tread portion in the rotating axial direction of the conventional tire is shown in FIG. 6, the rib 26 bearing a load W changes from a sectional shape shown by a phantom line under no load to a sectional shape shown by a solid line. That is, the rib 26 creates a crush bulging deformation at a maximum bulging amount dw toward the circumferential main grooves 2, 3. However, the slipping is restricted by a large restraint force fw at the surface of the rib 26 from the road surface in an arrow direction, and hence the maximum bulging amount dw of the rib 26 is restricted, so that the crush bulging deformation amount of the rib 26 is insufficient. Moreover, dotted lines show a bulging state at the inside of the rib 26.

Figure 7:
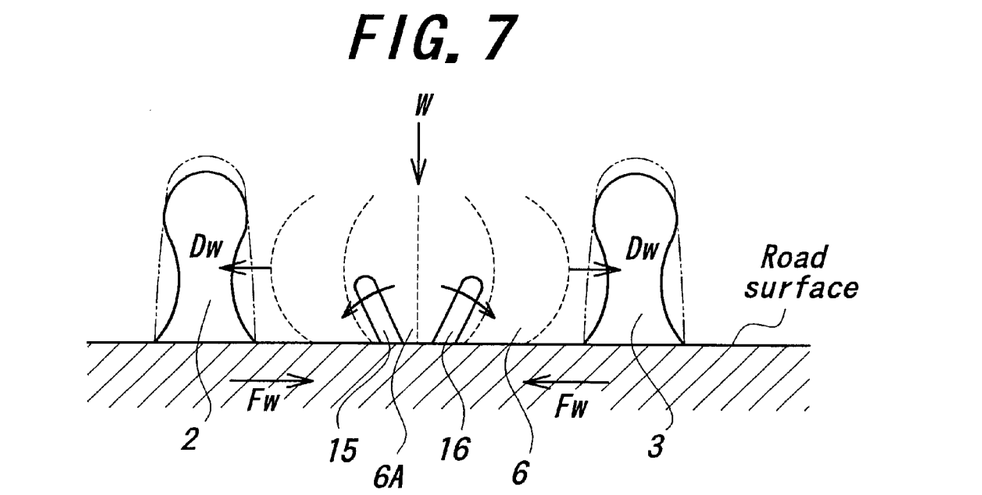
FIG. 7 is a diagrammatic view illustrating a crush bulging deformation of a rib at a ground contact state in the pneumatic tire according to the invention.

On the contrary, as the same section of the tire according to the invention as in FIG. 6 is shown in FIG. 7, it is possible to create a large crush bulging deformation in the rib 6 provided with the fine grooves 15, 16 as mentioned below. That is, the crush deformation at the widthwise central portion of the rib not escaping the bulging with respect to the crush deforming behavior is absorbed by the fine grooves 15, 16 formed in the rib 6. And also, the fine grooves 15, 16 fall down in arrow directions, respectively, so that they act to promote the bulging deformation of the rib 6 toward the circumferential main grooves 2, 3. For this end, at least two fine grooves 15, 16 are required in the rib 6.

The restraint force Fw at the surface of the rib 6 from the road surface is made smaller than the restraint force fw in the conventional tire by the above effects, so that the rib 6 can be bulged at a maximum bulging amount Dw toward the circumferential main grooves 2, 3 and hence it is possible to more easily create the crush deformation. That is, the maximum bulging amount Dw is larger than the maximum bulging amount dw.

Moreover, the maximum bulging amounts Dw, dw of the ribs 6, 26 have a close interrelation to the aforementioned back force fei and front force feo. That is, the maximum bulging amounts Dw, dw are in inverse proportion to maximum bulging amount de in the forward direction and rearward direction of the tire. Since the maximum bulging amount de is proportional to the back forced fei and the front force feo, the maximum bulging amounts Dw, dw have an inverse proportion to the back force fei and front force feo.

In the rib 6 having the maximum bulging amount Dw larger than the maximum bulging amount dw of the conventional tire, as shown by dotted lines in the lower parts of FIG. 5, the front force feo and the back force fei decrease together, and the front-back resultant force ft indicates a distribution shown by dot-dash lines in the lower part of FIG. 5. As seen from these results, a maximum value P2 of the front-back resultant force ft in the trailing is considerably lowered as compared with the maximum value P1 in the conventional tire. And also, when the rib portion 6A is made concave, as shown by a phantom line in the lower part of FIG. 5, a maximum value P3 of the front-back resultant force ft in the trailing can be made lower than the above maximum value P2.

Furthermore, a sum of front-back resultant force ft created in the rib 6 and front-back resultant force ft created in the shoulder region is always held at a constant balance in the same ground contact face of the tire, so that when the front-back resultant force ft (driving force) at the central region of the tread portion in the trailing is decreased, front-back resultant force ft (braking force) at the shoulder region of the tread portion in the trailing is simultaneously decreased.

Therefore, the maximum value P1 of the front-back resultant force ft of the rib in the trailing can be decreased by forming at least two fine grooves 15, 16 in the rib 6 to particularly control the wearing promotion of the rib 6 under the action of driving force and also control the wearing promotion of the shoulder region under free rotation and finally it is possible to prevent the occurrence of uneven wear in the tread rubber.

In any case, the similar effects can be obtained even in not only the straight fine grooves 15, 16 shown in FIG. 1 but also the zigzag fine grooves shown in FIG. 2. However, the zigzag fine grooves 15, 16 have a merit of enhancing the amount absorbing the crush deformation at the widthwise central portion of the rib 6 because the groove volume can be made larger than those of the straight fine grooves 15, 16.

On the other hand, the zigzag fine grooves 15, 16 hardly cause the fall-down deformation. In order to avoid this problem, as shown in FIG. 2, the zigzag fine grooves 15, 16 are arranged so as to form constricted parts corresponding to knots and width-enlarged parts corresponding to bellies in the rib portion 6A.

Further, a difference between a maximum width of the width-enlarged part and a minimum width of the constricted part in the rib portion 6A as to the width in the rotating axial direction of the tire is larger in a surface position of the rib portion 6A ($w_1-w_2$) than in a bottom position thereof ($wb_1-wb_2$) (not shown). In an extreme case, the groove bottom shape of the zigzag fine grooves 15, 16 are mentioned to be a straight shape having no width-enlarged part nor constricted part.

Alternatively, the similar effect can be obtained by the fine grooves 15, 16 having such a form that the bisector 15c, 16c is parallel to the normal line VL as shown in FIG. 3, or by the fine grooves 15, 16 having such a form that the bisector 15c, 16c is inclined with respect to the normal line VL so as to widen toward an inside of the tire as shown in FIG. 4. Moreover, the fine grooves 15, 16 shown in FIG. 4 more facilitate the falling-down and have a merit of more increasing the maximum bulging amount Dw.

And also, it is favorable that the surface of the rib portion 6A shown in FIG. 4 is made offset radially inward by a distance δ with respect to the surface of the rib portion 6B defined by the circumferential groove 2, 3 and the fine groove 15, 16 adjacent thereto. In this case, the ground contact pressure at the central part of the rib 6 hardly bulging toward the circumferential main grooves 2, 3 can be decreased by making the surface of the rib portion 6A offset radially inward, which contributes to increase the maximum bulging amount Dw of the rib 6.

Furthermore, it is favorable that the rib portion 6A is located at a center of the rib 6 in the rotating axial direction of the tire. And also, it is favorable that a depth h of the fine groove 15, 16 is not less than 0.3 times a groove depth H of the circumferential main groove 2, 3. Moreover, an inclination angle α of the fine groove 15, 16 shown in FIG. 4 with respect to the normal line VL is preferable to be within a range of 5–10°.

The following examples are given in illustration of the invention and are not intended as limitations thereof.

EXAMPLES 1–5

There are provided five 15° taper radial ply tires for truck and bus having a tire size of 275/70R22.5 for Examples 1–5. These tires have tread patterns shown in FIGS. 1 and 2, wherein a depth H of circumferential main grooves 2, 3 is 14 mm. In the tires, a carcass is comprised of one rubberized ply containing steel cords arranged in a radial direction, and a belt is comprised of four rubberized steel cord cross layers.

A radius of curvature in a crown portion appearing at a section of the tire is 700 mm between inner edges of circumferential main grooves 4 and 5, and a value subtracting a radius of ground contact end (end of the crown portion) TE from a radius of a ground contact face at an equatorial plane E of the tire is 12.5 mm.

For the comparison, there is provided a conventional tire having the same structure as in the tire of Example 1 except that fine grooves 15, 16 are not formed.

The tires of Examples 1–3 are provided with straight fine grooves 15, 16 shown in FIG. 1, respectively, and the tires of Examples 4 and 5 are provided with zigzag fine grooves 15, 16 shown in FIG. 2, respectively. And also, the tire of Example 1 has a form of fine grooves 15, 16 shown in FIG. 3, and the tire of Example 2 has a form of fine grooves 15, 16 shown in FIG. 4, and the tire of Example 3 has such a form that a rib portion 6A in the tire of Example 2 is made concave. The dimensions of the fine grooves 15, 16 in the tires of Examples 1–5 are shown in Table 1 together with the conventional tire.

Then, a test for evaluating a resistance to uneven wear is conducted with respect to the tires of Examples 1–5 and the conventional tire as follows. That is, the test tire is mounted onto a 2-D4·4 type three-wheeled large truck and run on an expressway at a speed of 80 km/h under constant load over 10000 km, and thereafter a difference in worn amount between rib 6, 26 and rib of shoulder region in four tires mounted onto a driving shaft is measured. An average of the measured values (mm) of the worn amount difference is also shown in Table 1. Moreover, the smaller the numerical value, the better the resistance to uneven wear.

TABLE 1

| Items | Conventional Example | Example 1 | 2 | 3 | 4 | 5 |
|---|---|---|---|---|---|---|
| Width of rib 6, 26 (mm) | 20 | 20 | 20 | 20 | 20 | 20 |
| Width of rib portion 6A (mm) | — | 10 | 10 | 10 | 10 | 10 |
| Depth h of fine groove (mm) | — | 10 | 10 | 10 | 10 | 10 |
| Width b of fine groove (mm) | — | 1.2 | 1.2 | 1.2 | 1.2 | 1.2 |
| Inclination angle of fine groove α° | — | 0 | 7 | 7 | 7 | 7 |
| Concave of rib portion δ (mm) | — | — | — | 1.0 | 1.0 | 1.0 |
| Difference $w_1 - w_2$ (mm) | — | 0 | 0 | 0 | 3.0 | 3.0 |
| Difference $wb_1 - wb_2$ (mm) | — | 0 | 0 | 0 | 1.5 | 0 |
| Worn amount difference (mm) | 0.8 | 0.67 | 0.64 | 0.60 | 0.57 | 0.55 |

As seen from the results of Table 1, all tires of Examples 1–5 are superior in the resistance to uneven wear to the conventional tire. In the example tires, the resistance to uneven wear in the inclined fine grooves 15, 16 is somewhat good as compared with the parallel fine grooves 15, 16, and the resistance to uneven wear in the zigzag fine grooves 15, 16 is somewhat good as compared with the straight fine grooves 15, 16, and the resistance to uneven wear when an amplitude at groove bottom in the zigzag fine grooves 15, 16 is small is somewhat good as compared with the case that the amplitude is large.

As mentioned above, according to the invention, there can be provided pneumatic tires having a resistance to uneven wear, particularly a resistance to center wear improved by disposing two or more fine grooves in an inner zone of a crown portion while maintaining a convex shape of the crown portion.

What is claimed is:

1. A pneumatic tire comprising a pair of bead portions, a pair of sidewall portions, a tread portion, a radial carcass of at least one ply reinforcing these portions, and a belt reinforcing the tread portion; said tread portion being provided with two or more circumferential main grooves formed in a tread rubber at an inner region sandwiched by both shoulder regions and one or more circumferential ribs defined by two adjoining circumferential main grooves, wherein at least two circumferential fine grooves are formed in the circumferential rib, and wherein the two adjoining circumferential fine grooves are extended zigzag in the circumferential direction of the tread portion so as to form constricted parts corresponding to knots and width-enlarged parts corresponding to bellies in the rib portion defined by these circumferential fine grooves, and wherein a difference between a maximum width of the width-enlarged part and a minimum width of the constricted part as to the width in a rotating axial direction of the tire is larger in a surface position of the rib portion than in a bottom position of the circumferential fine groove.

2. A pneumatic tire according to claim 1, wherein each of the circumferential fine grooves in the circumferential rib has such a form that a bisector putting at a center of a groove width of the fine groove in a direction of a groove depth thereof is parallel to a normal line passing through a center of a width of a rib portion defined by the two adjoining circumferential fine grooves.

3. A pneumatic tire according to claim 1, wherein each of the circumferential fine grooves in the circumferential rib has such a form that a bisector putting at a center of a groove width of the fine groove in a direction of a groove depth thereof is inclined with respect to a normal line passing through a center of a width of a rib portion defined by the two adjoining circumferential fine grooves so as to widen toward an inside of the tire.

4. A pneumatic tire according to claim 1, wherein a surface of a rib portion defined by the two adjoining circumferential fine grooves is offset radially inward with respect to a surface of a rib portion defined by the circumferential main groove and the circumferential fine groove adjacent thereto.

5. A pneumatic tire comprising a pair of bead portions, a pair of sidewall portions, a tread portion, a radial carcass of at least one ply reinforcing these portions, and a belt reinforcing the tread portion; said tread portion being provided with two or more circumferential main grooves formed in a tread rubber at an inner region sandwiched by both shoulder regions and one or more circumferential ribs defined by two adjoining circumferential main grooves, wherein at least two circumferential fine grooves are formed in the circumferential rib, and wherein the two adjoining circumferential fine grooves are extended zigzag in the circumferential direction of the tread portion so as to form constricted parts corresponding to knots and width-enlarged parts corresponding to bellies in the rib portion defined by these circumferential fine grooves, and wherein the two adjoining circumferential fine grooves have a circumferentially straight bottom shape.

6. A pneumatic tire according to claim 5, wherein each of the circumferential fine grooves in the circumferential rib has such a form that a bisector putting at a center of a groove width of the fine groove in a direction of a groove depth thereof is parallel to a normal line passing through a center of a width of a rib portion defined by the two adjoining circumferential fine grooves.

7. A pneumatic tire according to claim 5, wherein each of the circumferential fine grooves in the circumferential rib has such a form that a bisector putting at a center of a groove width of the fine groove in a direction of a groove depth thereof is inclined with respect to a normal line passing through a center of a width of a rib portion defined by the two adjoining circumferential fine grooves so as to widen toward an inside of the tire.

8. A pneumatic tire according to claim 5, wherein a surface of a rib portion defined by the two adjoining circumferential fine grooves is offset radially inward with respect to a surface of a rib portion defined by the circumferential main groove and the circumferential fine groove adjacent thereto.

* * * * *